(12) United States Patent
Ichikawa

(10) Patent No.: US 8,702,148 B2
(45) Date of Patent: Apr. 22, 2014

(54) STRUCTURE FOR FRONT SECTION OF VEHICLE BODY

(75) Inventor: Shuji Ichikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/702,604

(22) PCT Filed: May 24, 2011

(86) PCT No.: PCT/JP2011/061837
§ 371 (c)(1),
(2), (4) Date: Dec. 7, 2012

(87) PCT Pub. No.: WO2011/155321
PCT Pub. Date: Dec. 15, 2011

(65) Prior Publication Data
US 2013/0088048 A1 Apr. 11, 2013

(30) Foreign Application Priority Data

Jun. 10, 2010 (JP) ................................. 2010-133025
Jun. 10, 2010 (JP) ................................. 2010-133037

(51) Int. Cl.
*B62D 25/14* (2006.01)
(52) U.S. Cl.
USPC ............................................. 296/70; 180/90
(58) Field of Classification Search
USPC .................... 296/187.09, 193.09, 70; 180/90
See application file for complete search history.

(56) References Cited

U.S. PATENT DOCUMENTS

| 8,029,046 B2* | 10/2011 | Yamada | 296/193.02 |
| 2009/0243336 A1* | 10/2009 | Honji et al. | 296/187.09 |
| 2010/0109370 A1* | 5/2010 | Yamada | 296/70 |

FOREIGN PATENT DOCUMENTS

| JP | H01-169482 | 11/1989 |
| JP | H04-74185 | 6/1992 |
| JP | 08-067273 | 3/1996 |
| JP | 10-045034 | 2/1998 |
| JP | 2001-030954 | 2/2001 |
| JP | 2004-090818 | 3/2004 |
| JP | 2006-117097 | 5/2006 |
| JP | 2007-030627 | 2/2007 |
| JP | 2009-073305 | 4/2009 |

* cited by examiner

*Primary Examiner* — Lori Lyjak
(74) *Attorney, Agent, or Firm* — Rankin, Hill & Clark LLP

(57) ABSTRACT

A dash-board lower panel in a vehicle body includes a vertical plate-shaped partition plate that partitions the vehicle body into a front and a rear section, and an inclined plate that inclines downward and rearward from the bottom end of the partition plate. At least part of the rear surface of the partition plate is reinforced by a reinforcement plate. The reinforcement plate has an extended section at the bottom end thereof. The extended section extends from above a bent section, which is between the partition plate and the inclined plate, to below the bent section, and is joined to the inclined plate. A closed cross-section body, which is long and narrow in the vehicle-width direction, is formed by the extended section and the dash-board lower panel.

20 Claims, 15 Drawing Sheets

STRUCTURE FOR FRONT SECTION OF VEHICLE BODY

TECHNICAL FIELD

The present invention relates to a structure for a front section of a vehicle body, i.e. a front vehicle body structure, that includes left and right front side frames located on left and right sides of a front section of a vehicle body and extending in a front-rear direction of the vehicle body, and a dashboard lower panel, i.e. a lower dashboard panel, located rearwardly of the left and right front side frames and partitioning the vehicle body into front and rear sections.

Background Art

The lower dashboard panel includes a partition plate in of a vertical plate shape formed to partition the vehicle body into front and rear sections, and an inclined plate slantingly extending rearwardly and downwardly from the lower end of the partition plate. Generally, the lower dashboard panel is reinforced with a cross member extending in a width direction of the vehicle. Examples of such a technique where the lower dashboard panel is reinforced with the cross member are known from patent literature 1 and patent literature 2.

The lower dashboard panel disclosed in patent literature 1 comprises two members: an upper panel and a lower panel constituting upper and lower halves, respectively, of the lower dashboard panel. The upper panel is a vertical plate-shaped member having a bent portion formed integrally therewith and elongated in the vehicle width direction. The bent portion is formed in a V cross-sectional shape opening toward the rear of the vehicle body. The lower panel includes a vertical plate-shaped portion joined to the bent portion in such a manner as to close the opening of the V cross-sectional shape, and an inclined plate-shaped portion slantingly extending rearwardly and downwardly from the lower end of the plate-shaped portion. The bent portion of the V cross-sectional shape of the upper panel and the vertical plate-shaped portion of the lower panel together constitute a closed sectional body elongated in the vehicle width direction, and the lower dashboard panel is reinforced with the closed sectional body. Because the lower panel is a separate member from the upper panel, the number of component parts would increase, which can be a cause of increased cost.

Further, the lower dashboard panel disclosed in patent literature 2 is an integral molded component part comprising a vertical plate and an inclined plate constituting upper and lower halves, respectively, of the lower dashboard panel. The lower-half inclined plate slantingly extending rearwardly and downwardly from the lower end of the upper-half vertical plate. The vertical plate is reinforced with a cross member extending in the vehicle width direction. The cross member is located above a bent portion between the vertical plate and the inclined plate. Because the cross member is a separate member from the lower dashboard panel, the number of component parts would increase, which can be a cause of increased cost.

Further, in recent years, there has been a demand for a technique for efficiently suppressing vibration of the lower dashboard panel. One conceivable approach for meeting such a demand might be to fixedly attach a reinforcing plate to the upper-half vertical plate to thereby increase surface rigidity (i.e., rigidity along the surface of the panel) of the vertical plate.

PRIOR ART LITERATURE

Patent Literature 1: Japanese Patent Application Laid-Open Publication No. H10-45034
Patent Literature 2: Japanese Patent Application Laid-Open Publication No. 2007-30627

SUMMARY OF INVENTION

Technical Problem

It is therefore an object to provide a technique capable of increasing the rigidity of the lower dashboard surface while reducing the cost of the vehicle body.

Solution to Problem

According to one aspect of the instant application, there is provided a front vehicle body structure including left and right front side frames located on left and right sides of a front section of a vehicle body and extending in a front-rear direction of the vehicle body, and a lower dashboard panel, located rearwardly of the left and right front side frames and partitioning the vehicle body into front and rear sections, characterized in that the lower dashboard panel includes a partition plate of a vertical plate shape formed to partition the vehicle body into front and right sections, and an inclined plate slantingly extending rearwardly and downwardly from the lower end of the partition plate, at least a part of the rear surface of the partition plate is reinforced with a reinforcing plate, the reinforcing plate having an extension section provided on the lower end thereof, the extension section extends rearwardly from a region above a bent portion between the partition plate and the inclined plate to a region rearward of the bent portion so that the extension section is joined to the inclined plate, and the extension section and the lower dashboard panel together constitute a closed-sectional structure elongated in a vehicle width direction.

According to another aspect, the front vehicle body structure further comprises an upwardly convex tunnel section extending from a lower portion of the lower dashboard panel, and a cross member extending in the vehicle width direction along an upwardly convex shape of the tunnel section and disposed over an upper portion of the tunnel section and on a rear surface of the lower dashboard panel, and the cross member is joined to the extension section.

According to another aspect, the extension section has a substantially inverted-L cross sectional shape, and the extension section includes a horizontal plate extending rearwardly from a region above the bent portion along the upper surface of at least one of the left and right front side frames, and a vertical plate extending downward from the lower end of the horizontal plate and joined to the inclined plate.

According to another aspect, one end, in the vehicle width direction, of the cross member is formed in a shape corresponding to a cross-sectional shape of one end, in the vehicle width direction, of the extension section, and the one end, in the vehicle width direction, of the cross member and the one end, in the vehicle width direction, of the extension section are joined with each other.

According to another aspect, each of the left and right front side frames includes a left or right horizontal portion located forwardly of the partition plate and extending substantially horizontally, and a left or right inclined portion slantingly extending rearwardly and downwardly from the rear end of the left or right horizontal portion. The inclined portion of one of the left and right front side frames that is located closer to the horizontal plate is joined to the partition plate and the reinforcing plate via a bracket located close to the horizontal plate.

According to another aspect, the bracket has a substantially L cross-sectional shape, and the bracket includes: a horizontal plate-shaped, first joint section joined to the upper surface of at least one of the left and right inclined portions; a vertical plate-shaped, second joint section extending upwardly from the first joint section and joined to the partition plate and the reinforcing plate; and a rib protruding upwardly in such a manner as to extend continuously from the first joint section to the second joint section.

According to another aspect, the dashboard panel is reinforced with a cross member extending in the vehicle width direction along the bent portion, and a high-strength plate having a higher strength than the inclined plate of the lower dashboard panel is provided on a middle portion, in the vehicle width direction, of the rear end of the inclined plate. The inclined plate has an intermediate portion sandwiched between the cross member and the high-strength plate, the intermediate portion being more fragile than other portions not sandwiched between the cross member and the high-strength plate.

According to another aspect, a portion of the partition plate to which a brake booster for adjusting brake operating force applied by a human driver of the vehicle is mounted is reinforced with a panel reinforcing member, and the panel reinforcing member is separated from the cross member.

According to another aspect, the high-strength plate spans between rear portions of the left and right front side frames.

According to another aspect, the lower dashboard panel has an upwardly convex, front tunnel section extending rearwardly from a lower portion thereof, the high-strength plate is formed of a high-tensile steel plate and has an upwardly convex, rear tunnel section located immediately rearward of the front tunnel section, and the rear tunnel section extends rearwardly substantially continuously from the rear end of the front tunnel section.

According to another aspect, the vehicle body structure further comprises a front cross member spanning between rear portions of the left and right front side frames, and the front cross member has the front edge formed in a substantially arch shape curved such that a middle portion, in the vehicle width direction, of the front cross member is located more rearward than opposite ends, in the vehicle width direction, of the front cross member, the high-strength plate being joined to the front cross member along the front edge.

Advantageous Effects of Invention

According to one aspect, the lower dashboard panel is reinforced, at the rear surface of the partition plate, with the reinforcing plate, the reinforcing plate having the extension section provided on the lower end thereof, the extension section extending rearwardly from a region above the bent portion between the partition plate and the inclined plate to a region rearward of the bent portion. Thus, the extension section and the lower dashboard panel together constitute the closed-sectional structure elongated in the vehicle with direction. Namely, the closed-sectional structure, designed to reinforce the bent portion of the lower dashboard panel and other portions around the bent portion, can be provided by a simple construction where merely the reinforcing plate for increasing the surface rigidity of the partition plate is combined with the lower dashboard panel. Thus, there is no need to provide a separate reinforcing cross member. Namely, the construction of the closed-sectional structure can function as a cross member to thereby increase the rigidity of the lower dashboard panel. In this way, it is possible to minimize the number of component parts in the lower dashboard panel and in members that reinforce the lower dashboard panel. Thus, the present invention can increase the rigidity of the lower dashboard panel while reducing the weight and cost of the vehicle body. Further, the rigidity of the reinforcing plate can be increased with the closed-sectional structure. Because the thickness of the reinforcing plate itself can be reduced, the present invention can even further reduce the weight of the vehicle body. Besides, the reduced thickness of the reinforcing plate can increase formability of the reinforcing plate itself.

According to another aspect, the cross member is disposed over an upper portion of the tunnel section and on the rear surface of the lower dashboard panel, and the cross member extends in the vehicle width direction along the upwardly convex shape of the tunnel section. The cross member can be constructed as a separate member from the lower dashboard panel and the tunnel section provided on the lower dashboard panel. Thus, even where the cross member is shaped along the upwardly convex shape of the tunnel section, it can be formed with ease by an ordinary or conventional molding method, such as press molding. Thus, a joint position (including a height position) at which the cross member is joined to the extension section can always be set optimally irrespective of presence/absence of positional displacement (including height displacement) of the tunnel section relative to the extension section. Further, because the cross member is joined to the extension section, the present invention can achieve a reduced length of the cross member.

According to another aspect, the extension section, constituting the closed-sectional structure together with the lower dashboard panel, has a substantially inverted-L cross sectional shape. The horizontal plate forming the upper side of the inverted-L sectional shape extends rearwardly substantially along the upper surface of at least one of the left and right front side frames. Thus, when there has occurred a so-called frontal collision where collision force acts on the front surface of the vehicle, the frontal collision force transmits from the front to rear end of the front side frames and then transmits to the horizontal plate located on an extension of the front side frames. Thus, the extension section can efficiently receive the collision force from the front side frame and disperse the collision force to peripheral portions of the vehicle body.

According to another aspect, one end, in the vehicle width direction, of the cross member is formed in a shape corresponding to a cross-sectional shape of one end, in the vehicle width direction, of the extension section. Because the respective one ends of the cross member and the extension section have substantially the same sectional shape, they can be joined to each other smoothly.

According to another aspect, the inclined portion of one of the left and right front side frames that is located closer to the horizontal plate is joined to the partition plate and the reinforcing plate via the bracket located close to the horizontal plate. Thus, collision force from the front of the vehicle body transmits to the partition plate, the reinforcing plate and the closed-sectional structure via the left bracket from the front side frame. Consequently, the extension section can sufficiently receive the collision force from the inclined portion, although the front side frame has an inclined rear portion.

According to another aspect, the bracket is constructed as a high-rigidity member by being formed in a substantially L cross-sectional shape, and it has a rib functioning to suppress deformation. Thus, the bracket can sufficiently transmit collision force from the inclined portion to the partition plate, the reinforcing plate and the closed-sectional structure.

According to another aspect, the intermediate portion of the inclined portion of the lower dashboard panel, sandwiched between the cross member and the high-strength plate (formed, for example, of a high-tensile steel plate) is more fragile than other portions not sandwiched between the cross member and the high-strength plate. If a member (e.g., engine), disposed in front of the lower dashboard panel has hit the lower dashboard panel by being displaced rearwardly by frontal collision force, the fragile portion can greatly deform rearwardly, and accordingly, the member disposed in front of the lower dashboard panel can be displaced rearwardly by an increased amount. As a consequence, the present invention can even more efficiently absorb the collision impact. Besides, because the fragile portion absorbs the impact by deforming rearwardly, the present invention can suppress the entire lower dashboard panel from deforming rearwardly.

According to another aspect, the portion of the partition plate to which the brake booster is mounted is reinforced with the panel reinforcing member, and the panel reinforcing member is separated from the cross member. Thus, as the cross member is displaced rearwardly and/or deformed rearwardly by frontal collision force, the panel reinforcing member is insusceptible to influences of the cross member, and consequently the brake booster too is insusceptible to influences of the cross member.

According to another aspect, the high-strength plate, provided on the rear end of the inclined plate of the lower dashboard panel, spans between rear portions of the left and right front side frames. Thus, a rear end portion of the inclined portion of the lower dashboard panel has an even further increased strength, so that the present invention can even further enhance the deformation performance of the fragile portion responsive to the collision impact. As a consequence, the present invention can even more reliably prevent the entire lower dashboard panel from deforming rearwardly.

According to another aspect, the rear tunnel section extends rearwardly substantially continuously from the rear end of the front tunnel section provided on the lower dashboard panel. Because the high-strength plate is merely formed of a high tensile steel plate, the rear tunnel section can be formed with ease by press molding. Besides, because the rear tunnel section is formed of the high tensile steel plate, it can have an increased strength. Furthermore, by reducing the thickness of the rear tunnel section, it is possible to reduce the weight of the vehicle body.

According to another aspect, the front cross member, spanning between rear portions of the left and right front side frames, has the front edge formed in a substantially arch shape curved such that the middle portion, in the vehicle width direction, of the front cross member is located more rearward than the opposite ends, in the vehicle width direction, of the front cross member, the high-strength plate being joined to the front cross member along the front edge. Because the front edge is arch-shaped, it has a greater length than where it extends straight in the vehicle with direction. Thus, the high-strength plate and the front cross member can be joined to each other over a greater length or at an increased number of joint portions. Accordingly, it is possible to increase the overall joint area, so that the total strength of the joint portion (portions) (including a strength against sheer in the front-rear direction of the vehicle body). As a result, it is possible to even further increase the strength of the vehicle body.

DESCRIPTION OF EMBDODIMENTS

Figure 1:
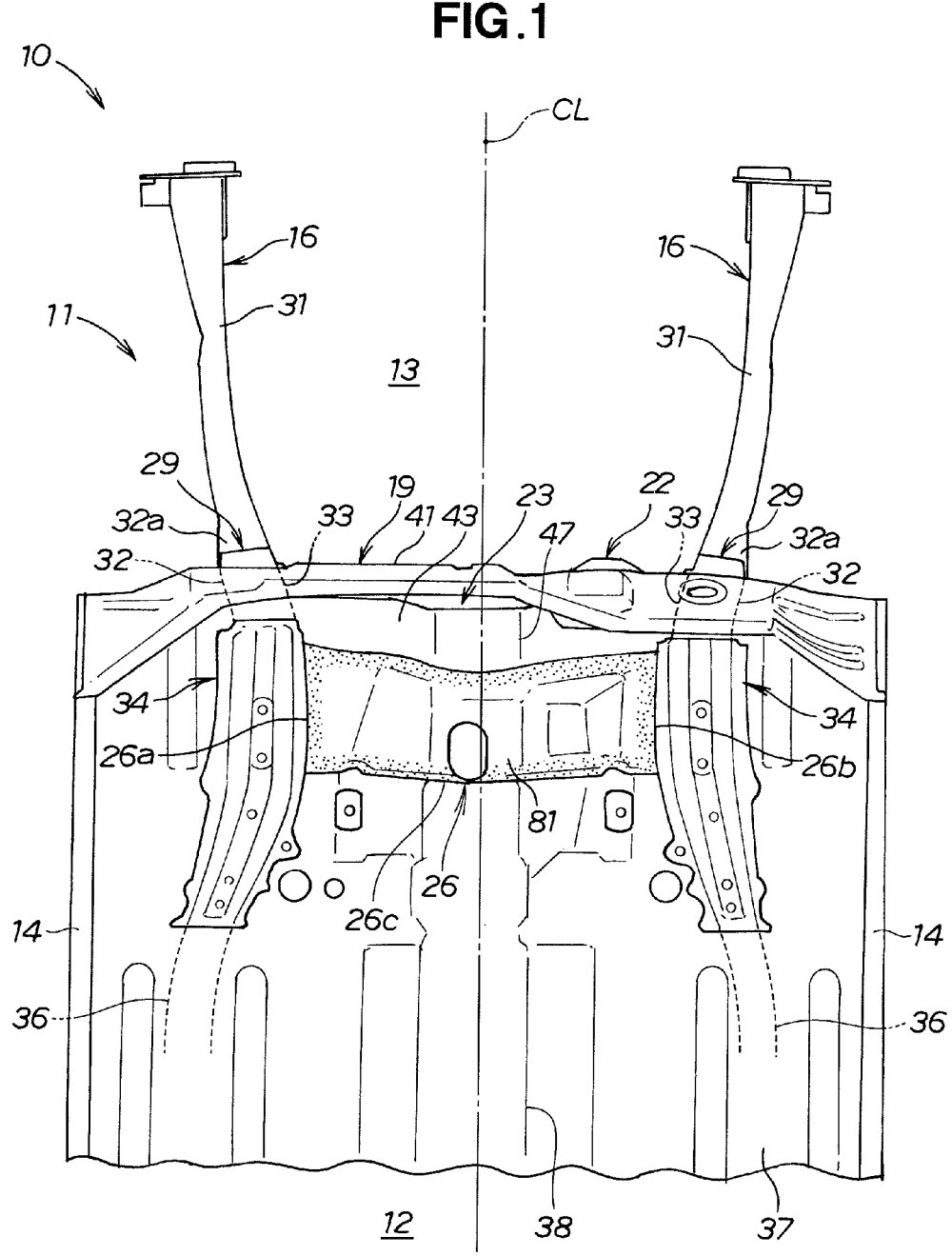
FIG. 1 is a top plan view of a front vehicle body structure according to an embodiment of the present invention.
Figure 2:
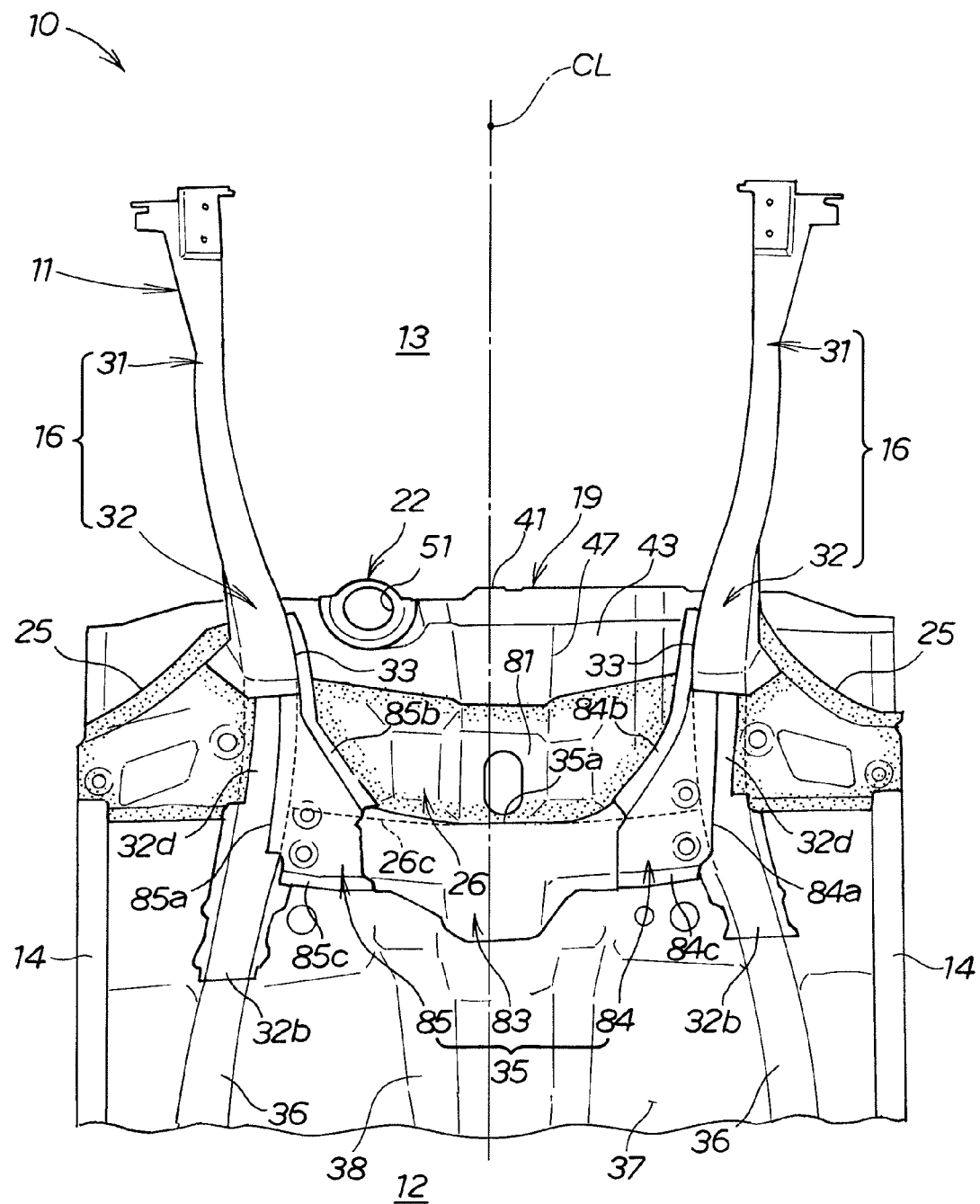
FIG. 2 is a bottom plan view of the front vehicle body structure of FIG. 1.
Figure 3:
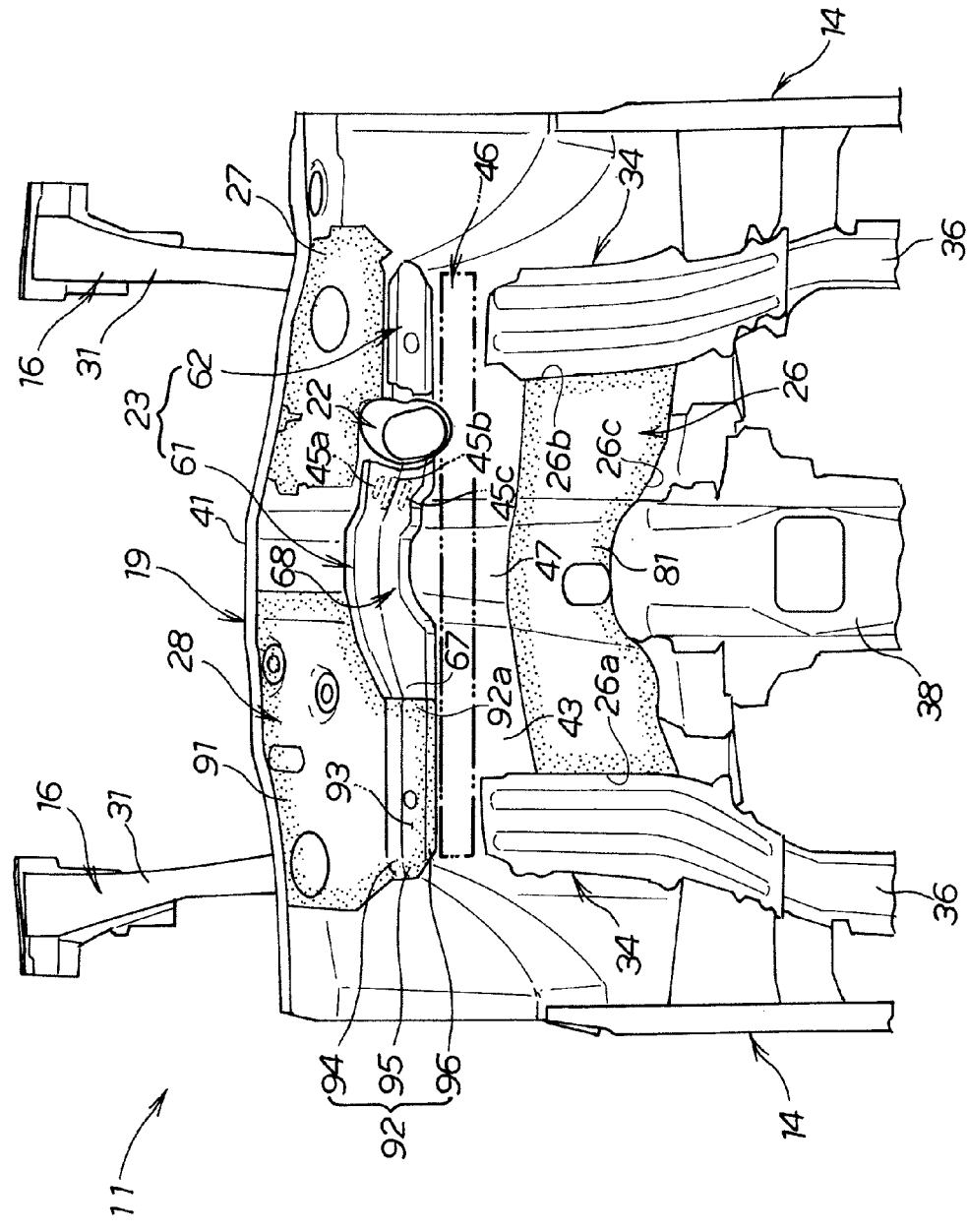
FIG. 3 is an upper perspective view of the front vehicle body structure of FIG. 1 taken from the side of a passenger compartment.

Embodiments of the present invention will be described hereinbelow with reference to the accompanying drawings.
Embodiments As shown in FIGS. 1 to 3, a vehicle 10 is, for example, a passenger vehicle, which includes, in the interior of a vehicle body 11, an engine room 13 located in a front section of the vehicle body 11 and a passenger compartment 12 located immediately behind the engine room 13. The vehicle body 11 is in the form of a monocoque body, which is formed in left-right symmetry with respect to the longitudinal centerline extending centrally across the width of the vehicle 10 in a front-rear direction of the vehicle body 11.

A front half section of the vehicle body 11 includes: left and right side sills 14; left and right front side frames 16; a lower dashboard panel 19; left and right outriggers 25; and left and right floor frames 36.

The left and right front side frames 16 are located on left and right sides of the front section (i.e., section forward of the lower dashboard panel 19) of the vehicle body 11 and extend in the front-rear direction of the vehicle body 11.

As shown in FIG. 2, the left and right outriggers 25 extend outwardly in the vehicle width direction from rear end portions of the left and right front side frames 16 to the left and right side sills 14, respectively. The left and right side sills 14 are located on left and right sides of a middle section (i.e., section rearward of the lower dashboard panel 19) of the vehicle 11 and extend in the front-rear direction of the vehicle body 11.

Figure 5:
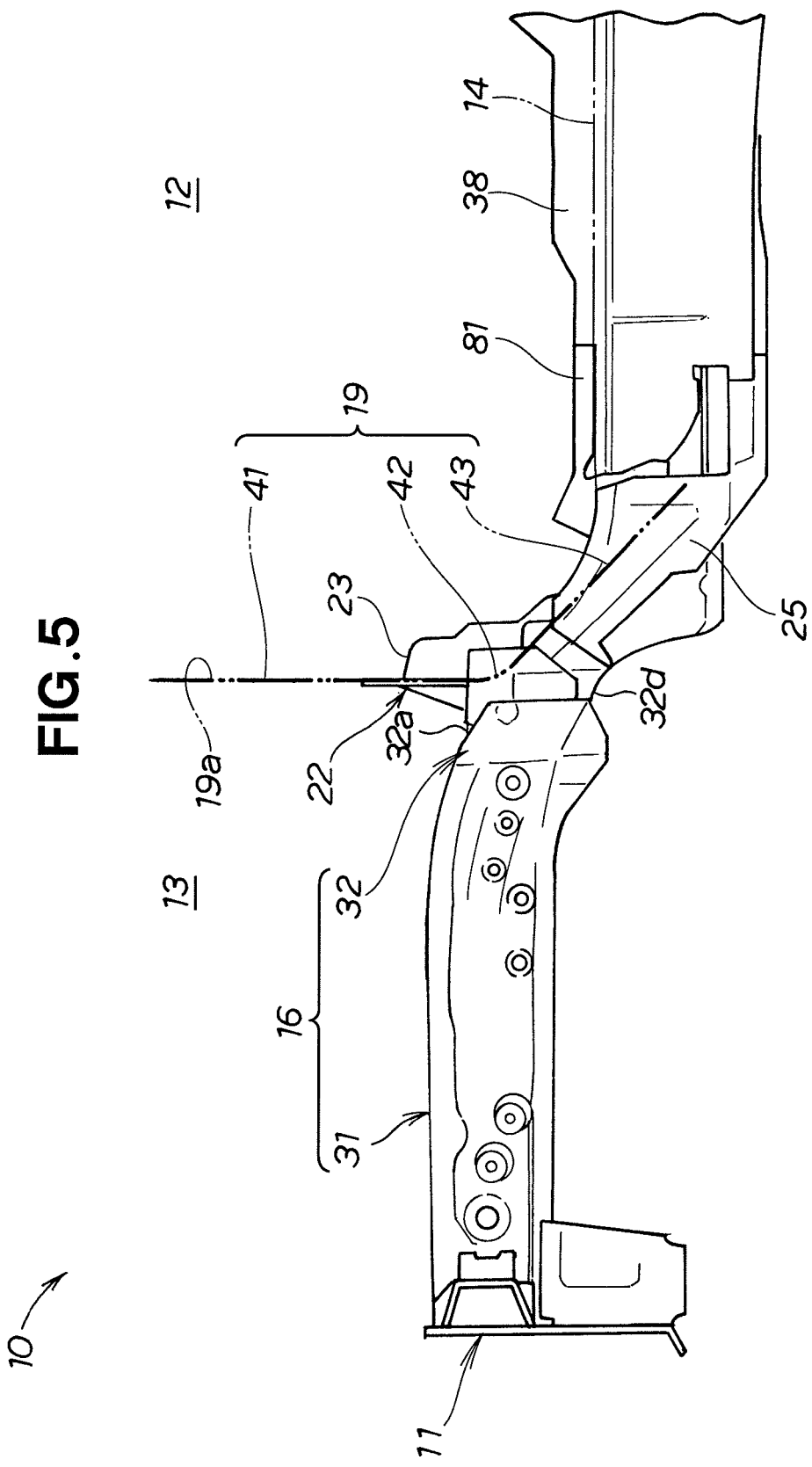
FIG. 5 is a side view of the front vehicle body structure of FIG. 1, which particularly shows the construction of the front vehicle body structure with a side sill removed therefrom for clarity.

Further, as shown in FIGS. 1, 3 and 5, the lower dashboard panel 19 is a partition wall located rearwardly of the left and right front side frames 16 and partitioning the vehicle body 11 into the front and rear section, i.e. partitioning between the front engine room 13 and the rear passenger compartment 12. The lower dashboard panel 19 includes a partition plate 41 and an inclined plate 43, constituting upper and lower halves, respectively, of the lower dashboard panel 19. The partition plate 41 is in the form of a substantially vertical flat plate located above inclined portions 32 of the front side frames 16, and the inclined plate 43 slantingly extending rearwardly and downwardly from the lower end of the partition plate 41.

The rear end of the lower dashboard panel 19, i.e. the rear end of the inclined plate 43, is joined to a floor panel 37. The floor panel 37 is a substantially flat plate-shaped member constituting a floor of the passenger compartment 12, and the floor panel 37 has a center tunnel 38 formed in a middle region thereof in the vehicle width direction and extending in the front-rear direction of the vehicle body. The center tunnel 38 is curved upwardly convexly from the floor panel 37 and has a substantially inverted-U curved cross-sectional shape.

Each of the left and right front side frames 16 includes a left or right horizontal portion 31 located forwardly of the partition plate 41 of the lower dashboard panel 19 and extending substantially horizontally, and a left or right inclined portion 32 slantingly extending rearwardly and downwardly from the rear end of the left or right horizontal portion 31.

As shown in FIG. 1 or 2, the left and right floor frames 36 extend rearwardly from rear end portions 32b of the left and right front side frames 16 to be located in the passenger compartment 12, so that the left and right floor frames 36 support the floor panel 37.

Left and right frame reinforcing plates 34 are superposed on and joined to at least one of the left and right inclined portions 32 and the left and right floor frames 36, directly or via the lower dashboard panel 19. At least one of the left and right inclined portions 32 and the left and right floor frames 36 can be reinforced with the left and right frame reinforcing plates 34.

Now, the embodiment of the front vehicle body structure will be described in greater detail.

As shown in FIGS. 1 to 3 and 6, the lower dashboard panel 19 has a front tunnel section 47 extending rearwardly from a lower portion thereof and has an upwardly convex cross-sectional shape. The front tunnel section 47 extends from a corner portion 42, i.e. a bent portion 42, between the partition plate 41 and the inclined plate 43 to the inclined plate 43. The front tunnel section 47 is located centrally in the vehicle width direction and curved upwardly toward the passenger compartment 12 in a substantially inverted-U cross-sectional shape.

As shown in FIGS. 3, 4, 6, 7 and 15, the partition plate 41 of the lower dashboard panel 19 has at least a part (e.g., substantially left half) of its inner surface facing the passenger compartment 12 (i.e., rear surface 19a of the lower dashboard panel 19) reinforced with a reinforcing plate 28, so that surface rigidity of the partition plate 41 (i.e., rigidity along the surface of the lower dashboard panel 19) is increased. More specifically, the reinforcing plate 28 is an integrally molded component part that includes a reinforcing plate body 91 superposed on and joined to the rear surface 19a of the partition plate 41, and a bent section (extension section) 92 formed at the lower end of the reinforcing plate body 91.

The extension section 92 provided at the lower end of the reinforcing plate 28 extends rearwardly from a region above the bent portion 42 between the partition plate 41 and the inclined plate 43 to a region rearward of the bent portion 42 and is joined to the inclined plate 43. Thus, the extension section 92 and the lower dashboard panel 19 together constitutes a closed-sectional structure 93 elongated in the vehicle width direction.

Figure 15:
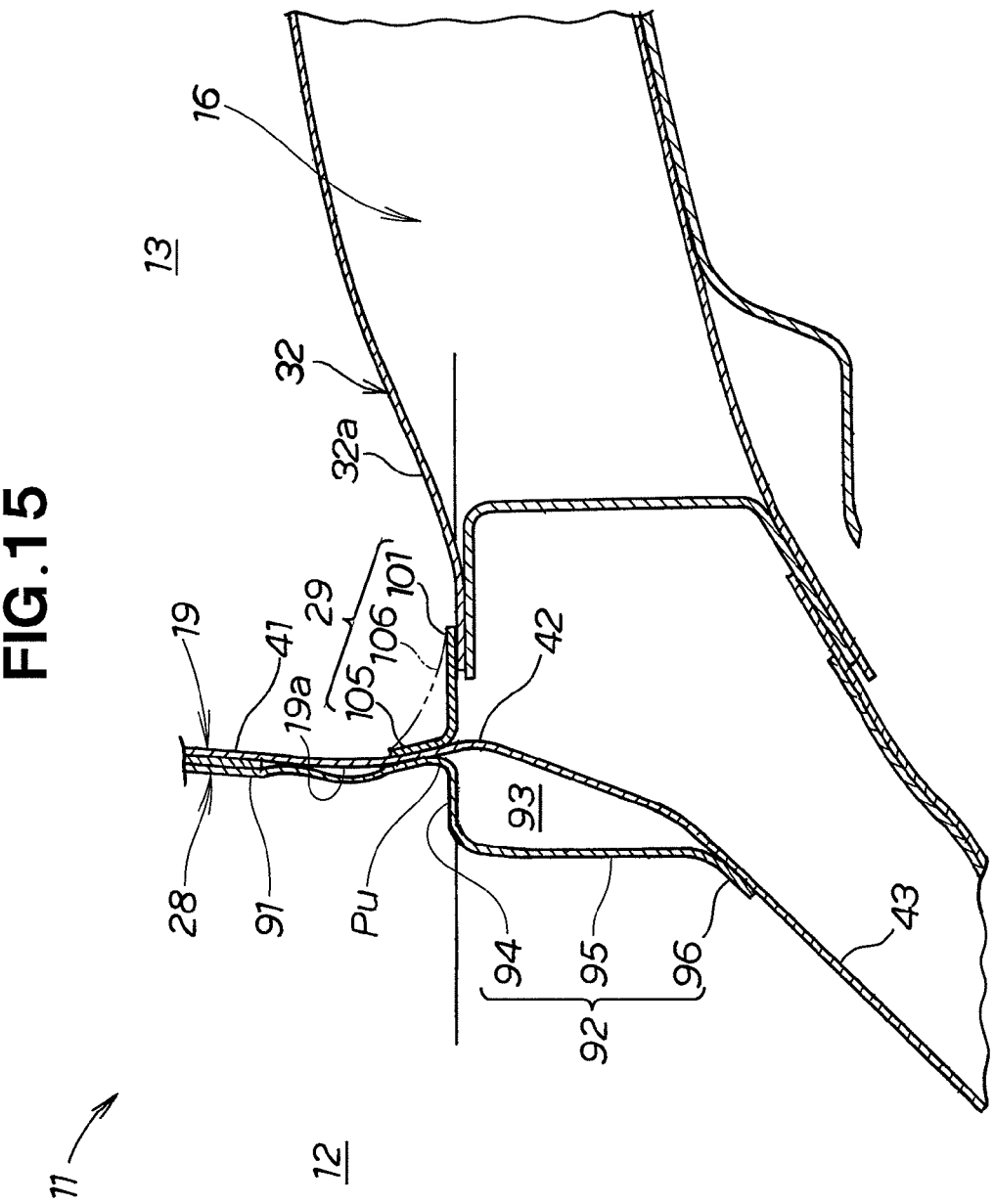
FIG. 15 is a sectional view taken along line 15-15 of FIG. 14.

More specifically, as shown in FIG. 15, the extension section 92 has a substantially inverted-L cross-sectional shape, and it includes a substantially horizontal plate 94 (extension portion 94) extending rearwardly from a region Pu above the bent portion 42, a vertical plate 95 (vertical portion 95) extending substantially vertically downwardly from the rear end of the horizontal plate 94, and a flange 96 slantingly extending rearwardly and downwardly from the lower end of the vertical plate 95. The horizontal plate 94 extends rearwardly along the upper surface 32a (upper wall 32a) of at least one of the left and right front side frames 16. The vertical plate 95 is joined to the inclined plate 43 by the lower surface of the flange 96 being joined to the upper surface of the inclined plate 43. Thus, the extension section 92 is joined to the inclined portion 32 of the left front side frame 16 via the inclined surface 43.

Figure 6:
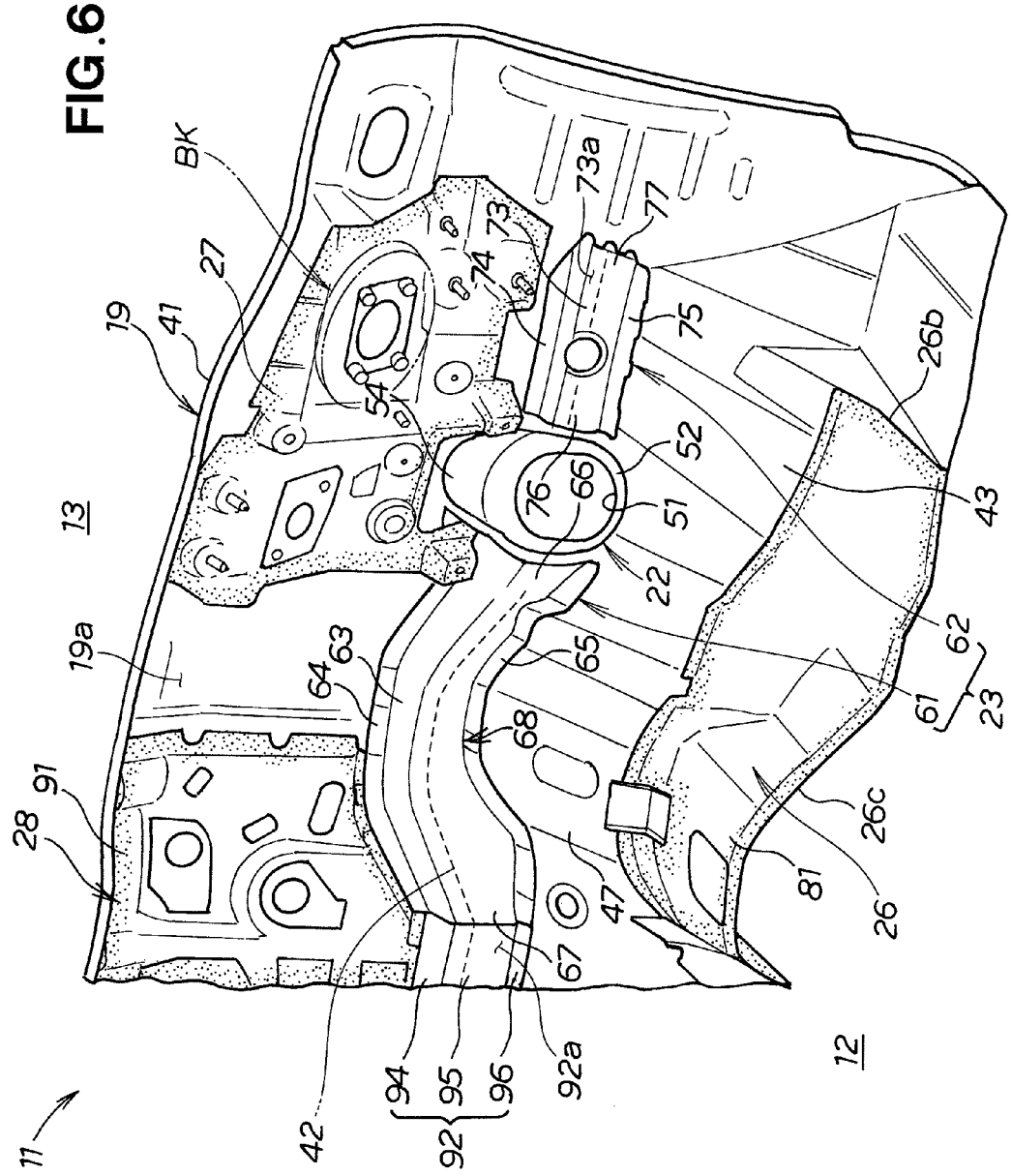
FIG. 6 is a perspective view showing a lower dashboard panel, a cross member and other component parts around the lower dashboard panel and cross member shown in FIG. 3.

Further, as shown in FIG. 6, the lower dashboard panel 19 includes a joint cover 22 provided on the corner or bent portion 42 between the partition plate 41 and the inclined plate 43. As shown in FIGS. 4 and 8 to 11, the joint cover 22 is a substantially tapered hollow member extending from the lower dashboard panel 19 forwardly and downwardly toward the engine room 13, and it has an opening 51 formed in a bottom portion 52 thereof for passage therethrough of a steering shaft 21 (FIG. 4) of a steering apparatus.

More specifically, the joint cover 22 includes: the bottom portion 52 of a substantially circular plate shape facing forwardly and downwardly; a stepped portion 53 extending upwardly from side and rear edges of the bottom portion 52; a front surface portion 54 extending upwardly from the front edge of the bottom portion 52; a front flange 55 formed on and along the peripheral edge of the front surface portion 54; and a rear flange 56 formed on and along the side and rear edges of the stepped portion 53. The rear flange 56 is formed continuously with the front flange 55.

Figure 8:
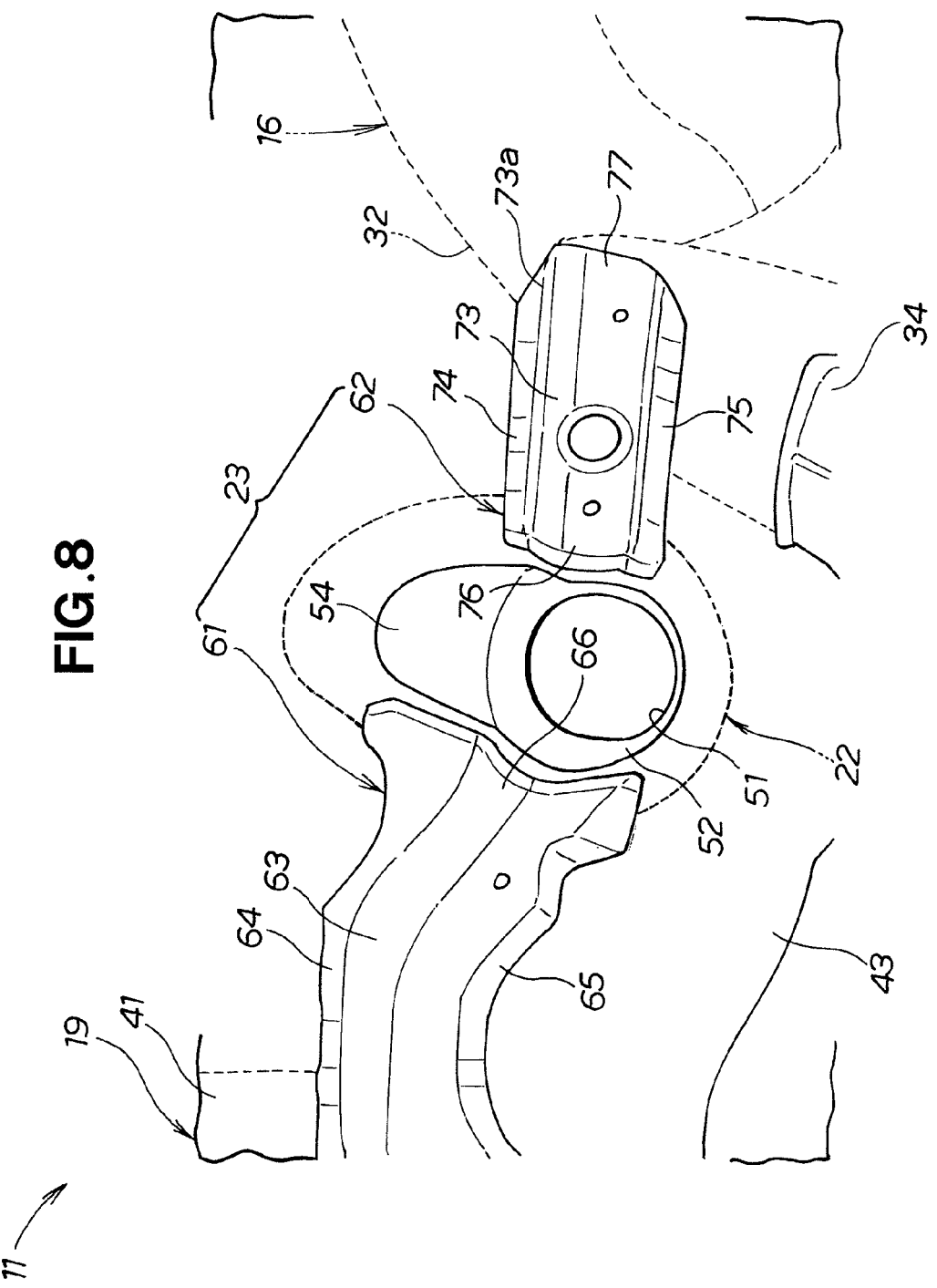
FIG. 8 is a perspective view showing relevant sections of the front vehicle body structure including the cross member, a joint cover and other component parts around the cross member and joint cover shown in FIG. 6.

Further, as shown in FIGS. 3, 6 and 8, the lower dashboard panel 19 is reinforced with a cross member 23 superposed on the rear surface 19a. The cross member 23 is a member elongated in the vehicle width direction and disposed on the corner or bent portion 42 between the partition plate 41 and the inclined plate 43, and the cross member 23 has a substantially inverted-L cross-sectional shape as viewed in the vehicle width direction. Namely, the cross member 23 extends in the vehicle width direction along the bent portion 42.

The cross member 23 constructed in the aforementioned manner is divided, starting at a portion thereof located at the joint cover 22, into two portions in the vehicle width direction. Namely, the cross member 23 comprises two divided component parts, i.e. a left cross member 61 and a right cross member 62. The left cross member 61 and the right cross member 62 are integrated together by the joint cover 22, the lower dashboard panel 19 and the cross member 23 being joined to one another. Alternatively, the cross member 23 can be constructed of a single component part equivalent to the aforementioned two divided component parts.

Figure 4:
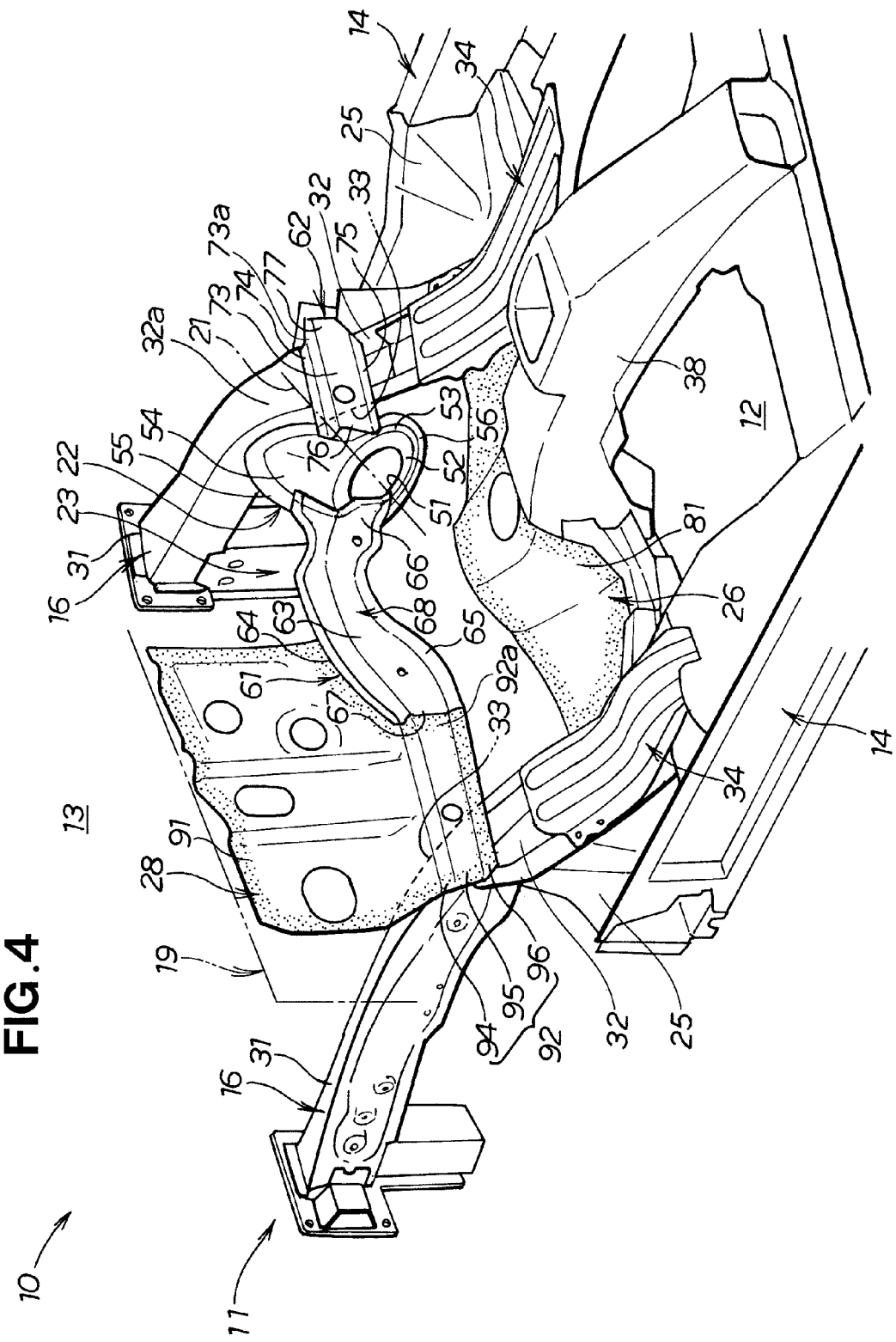
FIG. 4 is an upper perspective view of the front vehicle body structure of FIG. 1 taken from the side of the passenger compartment, which particularly shows a construction of the front vehicle body structure with a lower dashboard panel removed therefrom for clarity.

More specifically, as shown in FIG. 4, the left cross member 61 includes: a member body 63 of a substantially inverted-L cross-sectional shape; an upper flange 64 extending upwardly from the upper end of the member body 63; and a lower flange 65 extending rearwardly and downwardly from the lower end of the member body 63. From within the passenger compartment 12, the upper flange 64 is superposed on and joined to the partition plate 41. Similarly, from within the passenger compartment 12, the lower flange 65 is superposed on and joined to the upper surface of the inclined plate 43.

Figure 7:
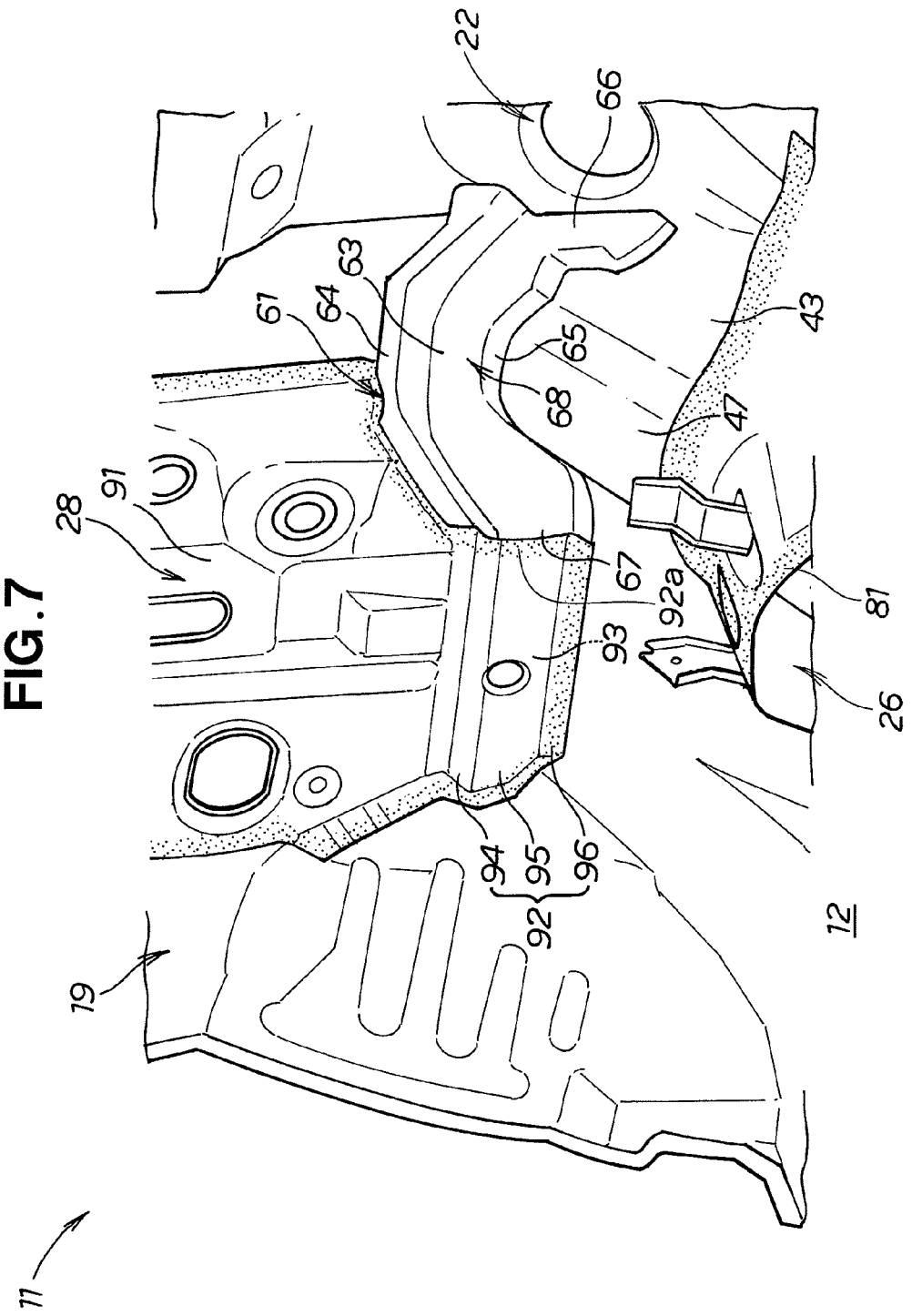
FIG. 7 is a perspective view taken from the side of the passenger compartment, which particularly shows relationship among the cross member, the lower dashboard panel and a reinforcing plate shown in FIG. 3.

As shown in FIGS. 4, 6 and 7, the left cross member 61 is fixedly jointed at the right ends of the upper and lower flanges 64 and 65 to the joint cover 22 with the lower dashboard panel 19 sandwiched therebetween. Further, the left end 67 of the left cross member 61 (i.e., one end 67, in the vehicle width direction, of the left cross member 61) is formed in a substantially inverted-L cross-sectional shape corresponding to the sectional shape and size of one end 92a (right end 92a) of the extension section 92. Further, the one end 67 of the left cross member 61 and the one end 92a of the extension section 92 are abutted end to end against each other or superposed on each other and joined to each other. Because these one ends 67 and 92a have substantially the same cross-sectional shape, they can be joined to each other smoothly.

Figure 10:
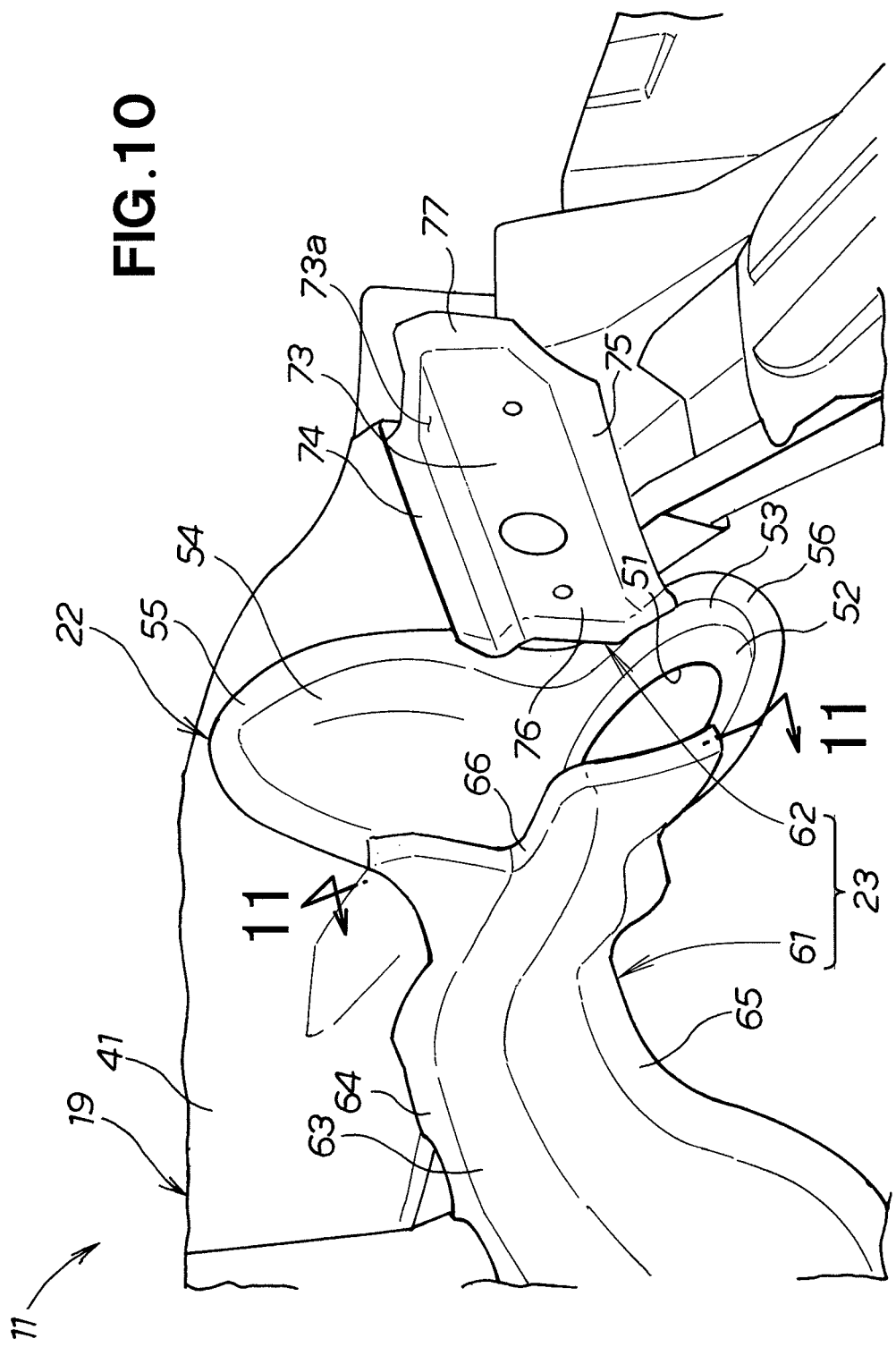
FIG. 10 is a perspective view showing relevant sections of the front vehicle body structure including the cross member, the joint cover and other component parts around the cross member and joint cover shown in FIG. 4.

As shown in FIGS. 6, 7 and 10, the right cross member 62 includes: a member body 73 of a substantially inverted-L cross-sectional shape; an upper flange 74 extending upwardly from the upper end of the member body 73; and a lower flange 75 extending rearwardly and downwardly from the lower end of the member body 73. The upper flange 74 is superposed on and joined to the partition plate 41 from within the passenger compartment 12. The lower flange 75 is superposed on and joined to the upper surface of the inclined plate 43.

Figure 9:
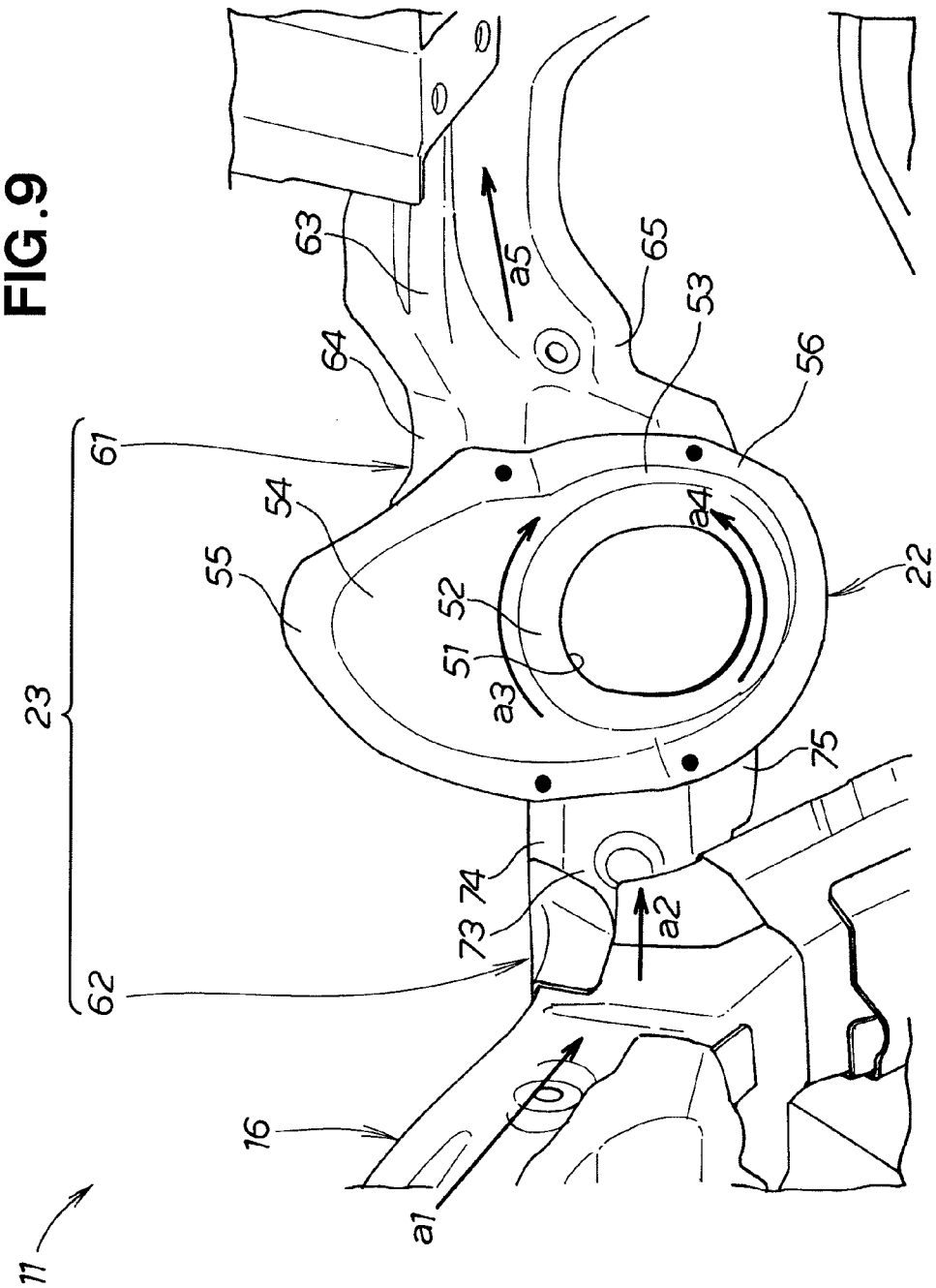
FIG. 9 is a perspective view taken from the side of an engine room, which particularly shows the cross member, the joint cover and other component parts around the cross member and joint cover shown in FIG. 4.
Figure 11:
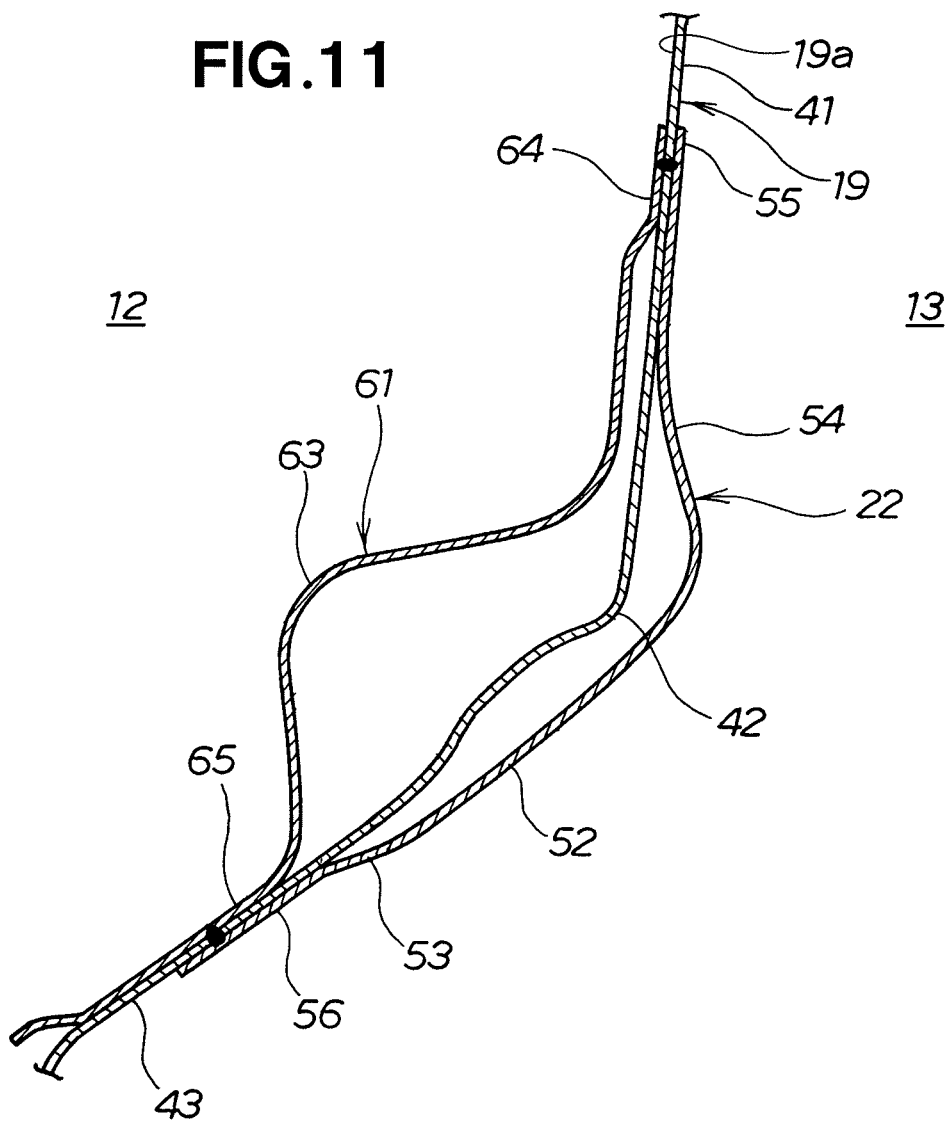
FIG. 11 is a sectional view taken along line 11-11 of FIG. 10.

As shown in FIGS. 9 and 11, the right cross member 62 is fixedly jointed at the left ends 76 of the upper and lower flanges 74 and 75 to the joint cover 22 with the lower dashboard panel 19 sandwiched therebetween. Further, the right end 77 of the right cross member 62 (i.e., right end 77, in the vehicle width direction, of the right cross member 62) is joined to the inclined portion 32 of the right front side frame 16 via the inclined surface 43 of the lower dashboard panel 19.

Namely, the joint cover 22 and the left and right cross members 61 and 62 are provided on the bent portion 42 of the lower dashboard panel 19. Further, the left and right cross members 61 and 62 are joined to the joint cover 22 with the lower dashboard panel 19 sandwiched therebetween. Thus, the lower dashboard panel 19 can be even further enhanced through synergy between the bent portion 42 originally having high rigidity (see FIG. 6), the joint cover 22 and the left and right cross members 61 and 62.

The foregoing may be summarized as follows. Substantively, a single cross member elongated in the vehicle width direction is constructed of a combination of the cross member 23, comprising the left and right cross members 61 and 62, and the extension section 92. Namely, the extension section 92 is a kind of cross member.

The closed-sectional structure 93 elongated in the vehicle width direction is constructed of the extension section 92 and the lower dashboard panel 19. The closed-sectional structure 93, designed to reinforce the bent portion 42 of the lower dashboard panel 19 and other portions around the bent portion 42, can be provided by a simple construction where merely the reinforcing plate 28 for increasing the surface rigidity of the partition plate 41 is combined with the lower dashboard panel 19. There is no need to provide a separate reinforcing cross member. Namely, the construction of the closed-sectional structure 93 can function as a cross member to increase the rigidity of the lower dashboard panel 19. In this way, it is possible to minimize the number of component parts in the lower dashboard panel 19 and in the members that reinforce the lower dashboard panel 19. Thus, the instant embodiment of the invention can increase the rigidity of the lower dashboard panel 19 while reducing the weight and cost of the vehicle body 11.

Further, the rigidity of the reinforcing plate 28 can also be increased with the closed-sectional structure 93. Because the thickness of the reinforcing plate 28 itself can be reduced, the instant embodiment can even further reduce the weight of the vehicle body 11. Besides, the reduced thickness of the reinforcing plate 28 can increase formability of the reinforcing plate 28 itself.

Further, as shown in FIG. 9, impact force transmitted from the front to rear of the right front side frame 16, for example, transmits to the right cross member 62 as indicated by arrow a1, then transmits from the right cross member 62 to the joint cover 22 as indicated by arrow a2, and then travels along the periphery of the bottom portion 52, as indicated arrows a3 and a4, to transmit to the right cross member 61 as indicated by arrow a5.

Figure 14:
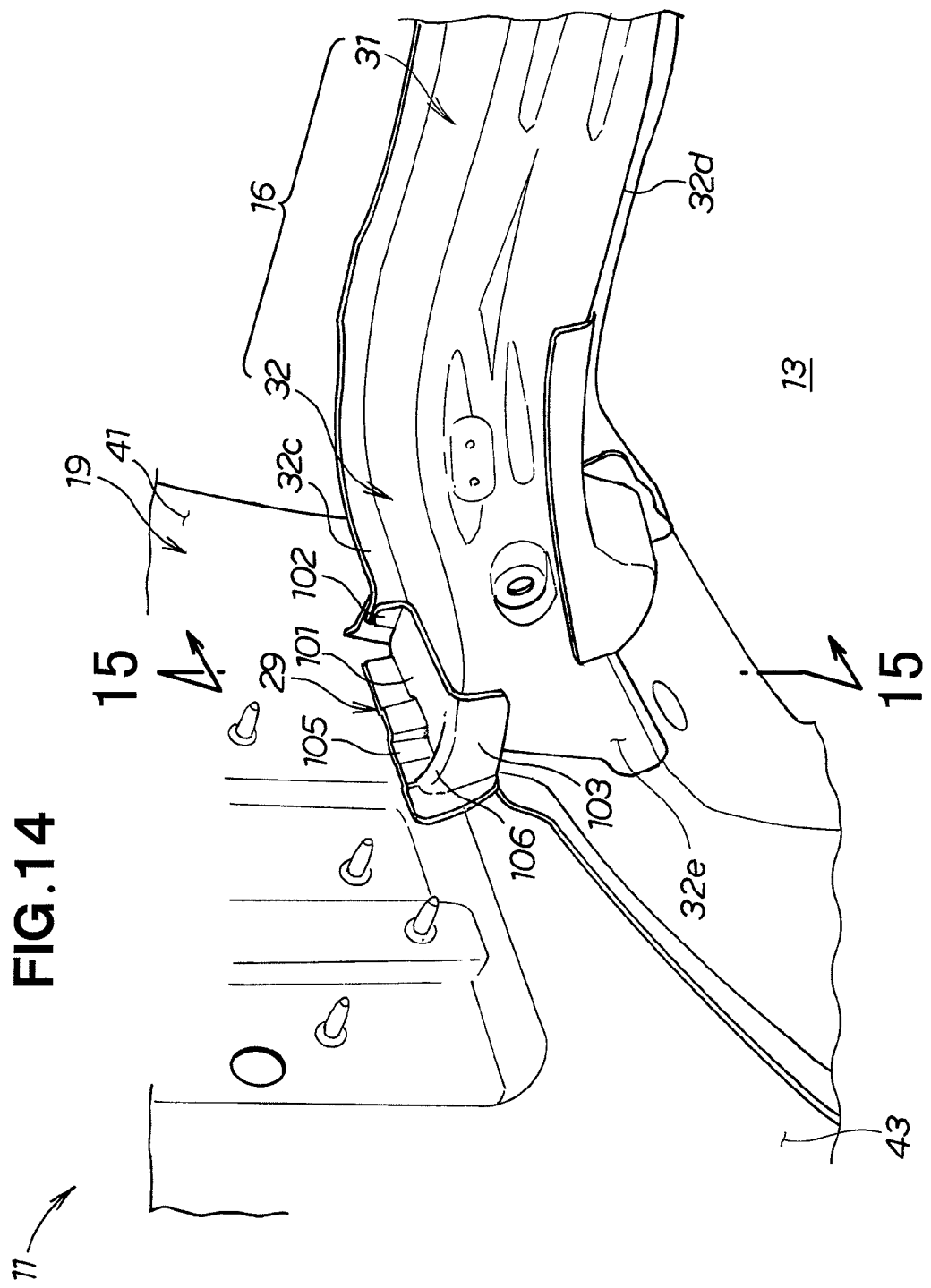
FIG. 14 is a perspective view taken from the side of the engine room, which particularly shows relationship between a left front side frame and the lower dashboard panel shown in FIG. 1.

Further, as shown in FIGS. 4, 14 and 15, the extension section 92 constructing the closed-sectional structure 93 together with the lower dashboard panel 19 has a substantially inverted-L cross-sectional shape. The horizontal plate 94 forming the upper side of the inverted-L sectional shape extends rearwardly substantially along the upper surface 32 of at least one of the left and right front side frames 16. Thus, when there has occurred a so-called frontal collision where collision force acts on the front surface of the vehicle 10, the frontal collision force transmits rearwardly from the front end of the front side frame 16 and then transmits to the horizontal plate 94 located on an extension of the front side frame 16. Thus, the extension section 92 can efficiently receive the collision force from the front side frame 16 and disperse the collision force to peripheral portions of the vehicle body 11.

Further, as shown in FIG. 6, a part of the cross member 23, i.e. the left cross member 61, is provided over the upwardly convex tunnel section 47, formed on the lower end portion of the lower dashboard panel 19, and on the rear surface 19a of the lower dashboard panel 19. More specifically, the left cross member 61 includes a curved portion 68 curved upwardly convexly along the tunnel section 47.

Such a left cross member 61 can be constructed as a separate member from the lower dashboard panel 19 and the tunnel section 47 provided on the lower dashboard panel 19. Thus, even where the cross member 23 is shaped along the upwardly convex shape of the tunnel section 47, it can be readily formed by an ordinary or conventional molding method, such as press molding. Thus, a joint position (including a height position) at which the cross member 23 is joined to the extension section 92 can always be set optimally irrespective of presence/absence of positional displacement (including height displacement) of the tunnel section 47 relative to the extension section 92. Further, because the cross member 23 is joined to the extension section 92, the instant embodiment can achieve a reduced length of the cross member 23.

Figure 12:
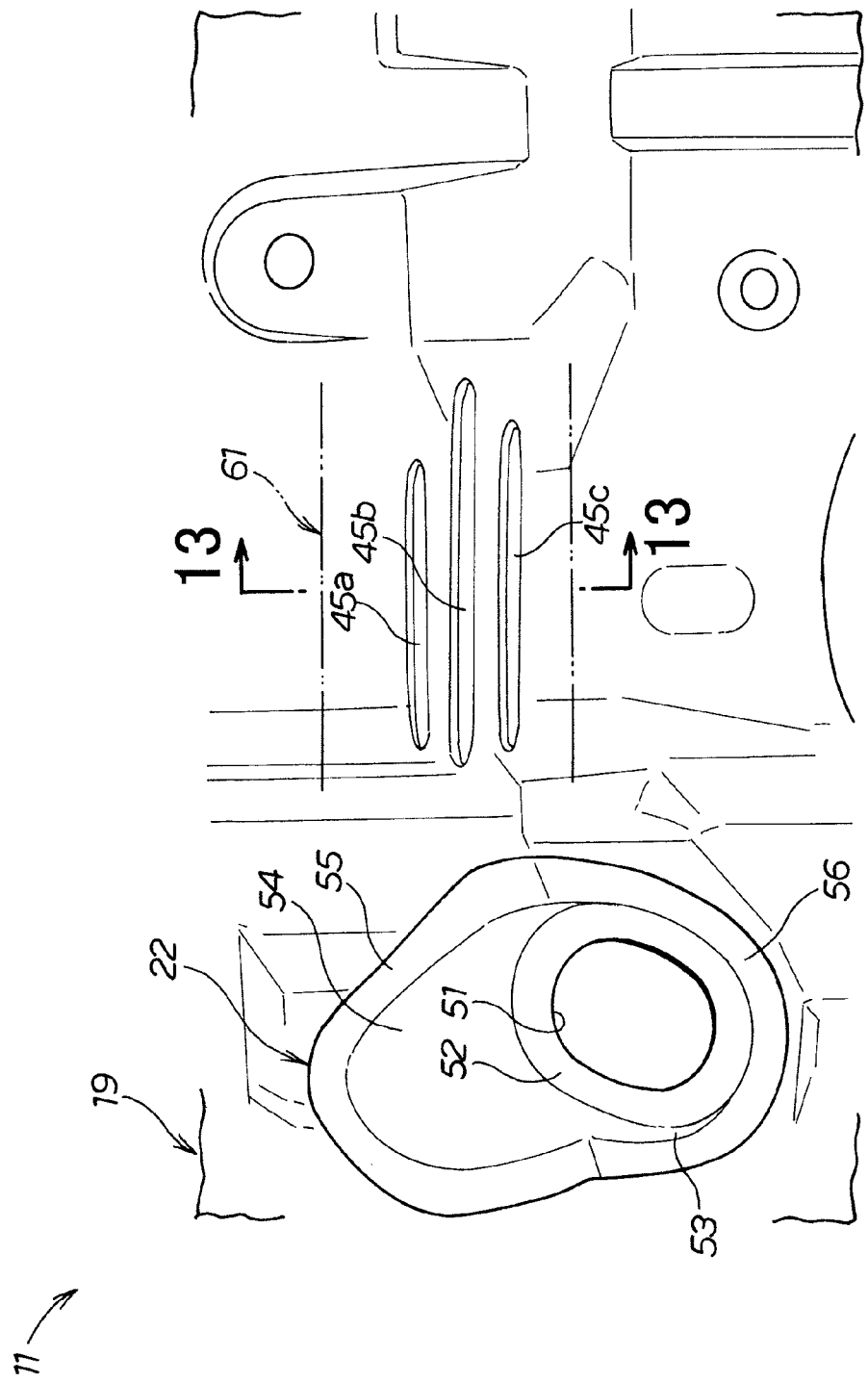
FIG. 12 is a perspective view taken from the side of the engine room, which particularly shows beads of the lower dashboard panel and other component parts around the beads shown in FIG. 6.
Figure 13:
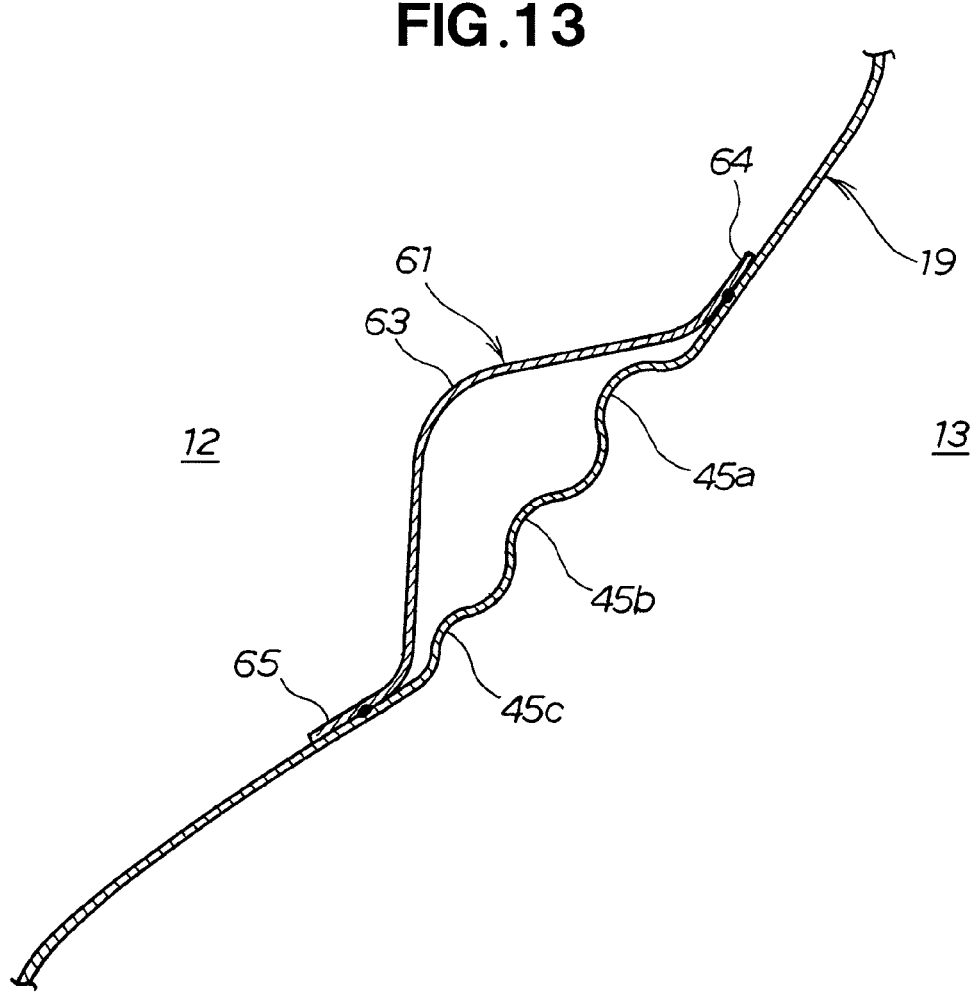
FIG. 13 is a sectional view taken along line 13-13 of FIG. 12.

As shown in FIGS. 3, 12 and 13, the lower dashboard panel 19 has a plurality of beads 45a to 45c formed on a portion thereof covered with the left cross member 61. The plurality of beads 45a to 45c are each formed on the lower dashboard panel 19 in an elongated shape along the length of the left cross member 61 and are arranged vertically at intervals. The beads 45a to 45c serve to increase a load transmission rate, in the vehicle width direction (left-right direction), of the cross member 23. Note that such beads 45a to 45c may also be provided on a portion of the lower dashboard panel 19 covered with the right cross member 62 along the length of the right cross member 62.

Further, as shown in FIG. 1, the inclined portion 32 of each of the left and right front side frames 16 extends rearwardly from the rear end of the horizontal portion 31 while curving convexly toward the middle of the vehicle width and toward the rear of the vehicle body. Of each of the left and right inclined portions 32, a side portion closer to the middle of the vehicle width will hereinafter be referred to as "convex portion 33". As shown in FIG. 4, the cross member 23 is located close to the left and right convex portion 33. Such an arrangement can not only prevent undesired curving of the left and right front side frames 16 but also transmit a frontal load, transmitted from the left and right front side frames 16, toward the rear of the vehicle body 11 via the joint cover 22 and the left and right cross members 61 and 62.

The cross member 23 is provided on the surface 19a (rear surface 19a) of the lower dashboard panel 19 facing the passenger compartment 12. Thus, in a case where a gearbox of an electric power steering apparatus (not shown) is mounted in the engine 13, the gearbox can be disposed near the lower dashboard panel 19, and accordingly, the engine room 13 can be reduced in length. In this way, a so-called short overhang type vehicle, where the vehicle 10 has a reduced length from the front end to the front wheels (not shown), can be realized with ease.

Further, in the partition plate 41 of the lower dashboard panel 19, as shown in FIGS. 3 and 6, a portion to which a brake booster BK (see FIG. 6) for adjusting brake operating force applied by a human driver of the vehicle is mounted by bolting is reinforced with a panel reinforcing member 27. The panel reinforcing member 27 is superposed on and joined to the rear surface of the partition plate 41, i.e. the surface 19a (rear surface 19a) of the lower dashboard panel 19 facing the passenger compartment 12. The above-mentioned brake booster BK may comprise, for example, a conventionally-known device for increasing braking force by boosting pressing force on a brake pedal using a predetermined negative pressure when the human driver has pressed down on the brake pedal.

The panel reinforcing member 27 is separated from the cross member 23. Thus, as the cross member 23 is displaced rearwardly and/or deformed rearwardly by frontal collision force, the panel reinforcing member 27 is insusceptible to influences of the cross member 23, and consequently the brake booster BK too is insusceptible to influences of the cross member 23.

As shown in FIG. 1, the inclined portions 32 of the left and right front side frames 16 are joined to the partition plate 41 via left and right brackets 29. The left and right brackets 29 are disposed in left-right symmetry with respect to the centerline CL extending centrally across the width of the vehicle width.

More specifically, of the left and right front side frames 16, the inclined portion 32 of the left front side frame 16 is located close to the horizontal plate 94 of the extension section 92, as noted above and as shown in FIGS. 14 and 15. The inclined portion 32 of the left front side frame 16 is joined to the partition plate 41 and the reinforcing plate 28 via the bracket 29 located near the horizontal plate 94. Namely, the left bracket 29 is joined to the upper surface 32a (upper wall 32a) of the left inclined portion 32. Thus, collision force from the front of the vehicle body 11 transmits from the inclined portion 32 of the left front side frame 16 to the partition plate 41, the reinforcing plate 28 and the closed-sectional structure 93 via the left bracket 29. Consequently, the extension section 92 of the reinforcing plate 28 can sufficiently receive the collision force from the inclined portion 32, although the left front side frame 16 has an inclined rear portion.

The left bracket 29, which is an integrally-molded member of a substantially L cross-sectional shape, comprises a horizontal plate-shaped, first joint section 101, a vertical plate-shaped, second joint section 105 and a rib 106, and the left bracket 29 is formed, for example, by press-molding a steel plate. The first joint section 101 is joined to the upper surface 32a of at least one of the left and right inclined portions 32. The second joint section 105 extends upwardly from the rear end of the first joint section 101 and is joined to the partition plate 41 and the reinforcing plate 28. The rib 106 protrudes upwardly in such a manner as to extend continuously from the front end of the first joint section 101 to the second joint section 105. Further, the rib 106 is located on the inner end, in the vehicle width direction, of the first joint section 101.

Further, the left bracket 29 includes joint portions 102 and 103 at opposite ends, in the vehicle width direction, of the first joint section 101. The first joint portion 102 extends upwardly from the outer end, in the vehicle width direction, of the first joint section 101 and is joined to an upper flange 32c of the left inclined portion 32. The second joint portion 103 extends downwardly from the inner end, in the vehicle width direction, of the first joint section 101 and is joined to the inner surface 32e (inner wall 32e) of the left inclined portion 32.

Namely, the left bracket 29 is constructed as a high-rigidity member by being formed in a substantially L sectional shape with the rib 106 functioning to suppress deformation. Thus, the bracket 29 can sufficiently transmit collision force from the inclined portion 32 to the partition plate 41, the reinforcing plate 28 and the closed-sectional structure 93.

Further, in the right cross member 62, as shown in FIGS. 4 and 6, the upper surface 73a (upper wall 73a) of the member body 73, having a substantially inverted-L cross-sectional shape, is set at substantially the same height as the horizontal plate 94 of the extended section 92. The inclined portion 32 of the right front side frame 16 and the right bracket 29 are located near the upper surface 73a of the member body 73. The right inclined portion 32 is joined to the partition plate 41 and the right cross member 62 via the right bracket 29. Namely, the right bracket 29 is joined to the upper surface 32a of the right inclined portion 32 in a substantially similar manner to the left bracket 29 shown in FIGS. 14 and 15. Thus, collision force from the front of the vehicle 11 transmits from the inclined portion 32 of the right front side frame 16 to the partition plate 41 and the right cross member 62 via the right bracket 29. Thus, the right cross member 62 can sufficiently receive the collision force from the inclined portion 32, although the right front side frame 16 has an inclined rear portion.

Further, as shown in FIG. 3, a high-strength plate 26 having a higher strength than the inclined plate 43 of the lower dashboard panel 19 is provided at least on a middle portion, in the vehicle width direction, of the inclined plate 43. The high-strength plate 26 is a plate member formed, for example, of a high-tensile steel plate. More specifically, the high-strength plate 26 is superposed on and joined to the upper or lower surface of at least a middle portion, in the vehicle width direction, of the rear end of the inclined plate 43. Alternatively, at least a middle portion, in the vehicle width direction, of the rear end of the inclined plate 43 is recessed, and the high-strength plate 26 is fitted in or placed on and joined to the recessed portion of the inclined plate 43.

The inclined plate 43 has an intermediate portion 46 sandwiched between the cross member 23 and the high-strength plate 26 (see FIG. 3). The intermediate portion 46 is a fragile portion having smaller rigidity and strength than the cross member 23 and the high-strength plate 26. More specifically, an upper end portion of the inclined plate 43 has high rigidity and high strength by being reinforced with the cross member 23, and a rear end portion of the inclined plate 43 has high rigidity and high strength by being reinforced with the high-strength plate 26. Thus, in the inclined plate 43, the intermediate portion 46 sandwiched between the cross member 23 and the high-strength plate 26 is a fragile portion having smaller rigidity and strength than the other portions not sandwiched between the cross member 23 and the high-strength plate 26. The intermediate portion 46 will hereinafter sometimes be referred to as "fragile portion 46".

If a not-shown member (e.g., engine), disposed in front of the lower dashboard panel 19, i.e. within the engine room 13, has hit the lower dashboard panel 19 by being displaced rearwardly by frontal collision force, the fragile portion 46 can greatly deform rearwardly, and accordingly, the member disposed in front of the lower dashboard panel 19 can be displaced rearwardly by an increased amount. As a consequence, the instant embodiment can even more efficiently absorb the collision impact. Besides, because the fragile portion 46 absorbs the impact by deforming rearwardly in the aforementioned manner, the instant embodiment can suppress the entire lower dashboard panel 19 from deforming rearwardly.

The high-strength plate 26 spans between rear portions of the left and right front side frames 16. Thus, a rear end portion of the inclined portion 43 of the lower dashboard panel 19 has an even further increased strength, so that the instant embodiment can even further enhance the deformation performance of the fragile portion 46 responsive to the collision impact. As a consequence, the instant embodiment can even more reliably suppress the entire lower dashboard panel 19 from deforming rearwardly.

Further, the lower dashboard panel 19 includes the upwardly convex front tunnel section 47 extending from a lower portion to an upper portion of the lower dashboard panel 19. The high-strength plate 26, which is formed of a high tensile steel plate, has an upwardly convex, rear tunnel section 81 formed integrally therewith and located immediately rearwardly of the front tunnel section 47. The rear tunnel section 81 extends rearwardly from the rear end of the front tunnel section 47. Because the high-strength plate 26 is merely formed of a high tensile steel plate, the rear tunnel section 81 can be formed with ease by press molding. Besides, because the rear tunnel section 81 is formed of a high tensile steel plate, it can have an increased strength. Furthermore, by reducing the thickness of the rear tunnel section 81, it is possible to reduce the weight of the vehicle body 11.

Further, as shown in FIG. 2, a cross member 35 (front cross member 35) spans between rear portions of the left and right front side frames 16. The front edge 35a of the front cross member 35 is formed in a substantially arch shape curved such that a middle portion, in the vehicle width direction, of the front cross member 35 is located more rearward than opposite ends, in the vehicle width direction, of the front cross member 35. The front cross member 35 comprises a body member 83 located centrally in the vehicle width direction, and left and right connection members 84 and 85 connected to opposite ends, in the vehicle width direction, of the body member 83.

The body member 83 is formed convexly along the inner surface (opposite from the passenger compartment 12) of the center tunnel 38 projecting from the floor panel 37 into the passenger compartment 12.

The left connection member 84 is joined, at its outer end 84a in the vehicle width direction, to a lower wall 32d of the inclined portion 32 of the left front side frame 16. The left connection member 84 is joined, at its inner end 84b in the vehicle width direction, to the left end of the high-strength plate 26. Further, the left connection member 84 is joined, at its rear end 84c, to the lower end 26c of the inclined plate 43 of the lower dashboard panel 19.

The right connection member 85 is joined, at its outer end 85a in the vehicle width direction, to a lower wall 32d of the inclined portion 32 of the right front side frame 16. The left connection member 84 is joined, at its inner end 85b in the vehicle width direction, to the right end of the high-strength plate 26. Further, the right connection member 85 is joined, at its rear end 85c, to the lower end 26c of the inclined plate 43 of the lower dashboard panel 19.

Namely, the high-strength plate 26 is joined to the front cross member 35 along the front edge 35a, Because the front edge 35a is arch-haped, it has a greater length than where it extends straight in the vehicle with direction. Thus, the high-strength plate 26 and the front cross member 35 can be joined to each other over a greater length or at an increased number of joint portions. Accordingly, it is possible to increase the overall joint area, so that the total strength of the joint portion (portions) (including a strength against sheer in the front-rear direction of the vehicle body 11). As a result, it is possible to even further increase the strength of the vehicle body 11.

INDUSTRIAL APPLICABILITY

The vehicle body 11 of the present invention is well suited for application to passenger vehicles, such as sedans and wagons.

Legend:

10 . . . vehicle, 11 . . . vehicle body 11, 12 . . . passenger compartment, 13 . . . engine room, 16 . . . front side frame, 19 . . . lower dashboard panel, 19a . . . rear surface, 23 . . . cross member, 26 . . . high-strength plate, 27 . . . panel reinforcing member, 28 . . . reinforcing plate, 29 . . . bracket, 31 . . . horizontal portion, 32 . . . inclined portion, 32a . . . upper surface, 35 . . . front cross member, 35a . . . front edge, 41 . . . partition plate, 42 . . . bent portion, 43 . . . inclined plate, 46 . . . fragile portion (intermediate portion), 47 . . . tunnel section (front tunnel section), 67 . . . one end, in the vehicle width direction, of cross member, 81 . . . rear tunnel section, 92 . . . extended section, 92a . . . one end, in the vehicle width direction, of the extended section, 93 . . . closed-sectional structure, 94 . . . horizontal plate, 95 . . . vertical plate, 101 . . . first joint section, 105 . . . second joint section, 106 . . . rib, BK . . . brake booster

The invention claimed is:

1. A front vehicle body structure including left and right front side frames located on left and right sides of a front section of a vehicle body and extending in a front-rear direction of the vehicle body, and a lower dashboard panel, located rearwardly of the left and right front side frames and partitioning the vehicle body into front and rear sections, characterized in that the lower dashboard panel includes a partition plate of a vertical plate shape formed to partition the vehicle body into front and rear sections, and an inclined plate slantingly extending rearwardly and downwardly from a lower end of the partition plate, at least a part of a rear surface of the partition plate is reinforced with a reinforcing plate, the reinforcing plate having an extension section provided on a lower end thereof, the extension section extends rearwardly from a region above a bent portion between the partition plate and the inclined plate to a region rearward of the bent portion so that the extension section is joined to the inclined plate, and the extension section and the lower dashboard panel together constitute a closed-sectional structure elongated in a vehicle width direction.

2. The front vehicle body structure according to claim 1, further comprising an upwardly convex tunnel section extending from a lower portion of the lower dashboard panel, and a cross member extending in the vehicle width direction along an upwardly convex shape of the tunnel section and disposed over an upper portion of the tunnel section and on the rear surface (19*a*) of the lower dashboard panel, and wherein the cross member is joined to the extension section.

3. The front vehicle body structure according to claim 1, wherein the extension section has a substantially inverted-L cross sectional shape, and wherein the extension section includes a horizontal plate extending rearwardly from a region above the bent portion along an upper surface of at least one of the left and right front side frames, and a vertical plate extending downward from a lower end of the horizontal plate and joined to the inclined plate.

4. The front vehicle body structure according to claim 2, wherein one end, in the vehicle width direction, of the cross member is formed in a shape corresponding to a cross-sectional shape of one end, in the vehicle width direction, of the extension section, and the one end, in the vehicle width direction, of the cross member and the one end, in the vehicle width direction, of the extension section are joined with each other.

5. The front vehicle body structure according to claim 3, wherein each of the left and right front side frames includes a left or right horizontal portion located forwardly of the partition plate and extending substantially horizontally, and a left or right inclined portion slantingly extending rearwardly and downwardly from a rear end of the left or right horizontal portion, and wherein the inclined portion of one of the left and right front side frames that is located closer to the horizontal plate is joined to the partition plate and the reinforcing plate via a bracket located close to the horizontal plate.

6. The front vehicle body structure according to claim 5, wherein the bracket has a substantially L cross-sectional shape, and wherein the bracket includes: a horizontal plate-shaped, first joint section joined to an upper surface of at least one of the left and right inclined portions; a vertical plate-shaped, second joint section extending upwardly from the first joint section and joined to the partition plate and the reinforcing plate; and a rib protruding upwardly in such a manner as to extend continuously from the first joint section to the second joint section.

7. The front vehicle body structure according to claim 1, wherein the dashboard panel is reinforced with a cross member extending in the vehicle width direction along the bent portion, a high-strength plate having a higher strength than the inclined plate of the lower dashboard panel is provided on a middle portion, in the vehicle width direction, of a rear end of the inclined plate, and the inclined plate has an intermediate portion sandwiched between the cross member and the high-strength plate, the intermediate portion being more fragile than other portions not sandwiched between the cross member and the high-strength plate.

8. The front vehicle body structure according to claim 7, wherein, in the partition plate, a portion to which a brake booster for adjusting brake operating force applied by a human driver of the vehicle is mounted is reinforced with a panel reinforcing member, and the panel reinforcing member is separated from the cross member.

9. The front vehicle body structure according to claim 7, wherein the high-strength plate spans between rear portions of the left and right front side frames.

10. The front vehicle body structure according to claim 7, wherein the lower dashboard panel has an upwardly convex, front tunnel section extending rearwardly from a lower portion thereof, the high-strength plate is formed of a high-tensile steel plate and has an upwardly convex, rear tunnel section located immediately rearward of the front tunnel section, and the rear tunnel section extends rearwardly substantially continuously from a rear end of the front tunnel section.

11. The front vehicle body structure according to claim 7, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

12. The front vehicle body structure according to claim 8, wherein the high-strength plate spans between rear portions of the left and right front side frames.

13. The front vehicle body structure according to claim 8, wherein the lower dashboard panel has an upwardly convex, front tunnel section extending rearwardly from a lower portion thereof, the high-strength plate is formed of a high-tensile steel plate and has an upwardly convex, rear tunnel section located immediately rearward of the front tunnel section, and the rear tunnel section extends rearwardly substantially continuously from a rear end of the front tunnel section.

14. The front vehicle body structure according to claim 8, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

15. The front vehicle body structure according to claim 9, wherein the lower dashboard panel has an upwardly convex, front tunnel section extending rearwardly from a lower portion thereof, the high-strength plate is formed of a high-tensile steel plate and has an upwardly convex, rear tunnel section located immediately rearward of the front tunnel section, and the rear tunnel section extends rearwardly substantially continuously from a rear end of the front tunnel section.

16. The front vehicle body structure according to claim 9, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

17. The front vehicle body structure according to claim 10, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

18. The front vehicle body structure according to claim 12, wherein the lower dashboard panel has an upwardly convex, front tunnel section extending rearwardly from a lower portion thereof, the high-strength plate is formed of a high-tensile steel plate and has an upwardly convex, rear tunnel section located immediately rearward of the front tunnel section, and the rear tunnel section extends rearwardly substantially continuously from a rear end of the front tunnel section.

19. The front vehicle body structure according to claim 12, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

20. The front vehicle body structure according to claim 13, which further comprises a front cross member spanning between rear portions of the left and right front side frames, and wherein the front cross member has a front edge formed in a substantially arch shape curved such that a middle portion, in the vehicle width direction, of the front cross member is located more rearward than opposite ends, in the vehicle width direction, of the front cross member, and the high-strength plate is joined to the front cross member along the front edge.

* * * * *